United States Patent
McClary et al.

(10) Patent No.: US 6,959,008 B2
(45) Date of Patent: Oct. 25, 2005

(54) ALIGNMENT OF TDM-BASED SIGNALS FOR PACKET TRANSMISSION USING FRAMED AND UNFRAMED OPERATIONS

(75) Inventors: Michael McClary, Newark, CA (US); Sharath Narahari, Pleasanton, CA (US); David R. Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 544 days.

(21) Appl. No.: 09/837,448

(22) Filed: Apr. 17, 2001

(65) Prior Publication Data

US 2003/0016699 A1 Jan. 23, 2003

Related U.S. Application Data

(60) Provisional application No. 60/280,661, filed on Mar. 31, 2001.

(51) Int. Cl.$^7$ ................................................ H04J 3/24
(52) U.S. Cl. .................. 370/474; 370/492; 370/506
(58) Field of Search .............................. 370/352, 389, 370/395, 463, 465, 470, 474, 505, 506, 516, 492

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 4,819,226 A | * | 4/1989 | Beckner et al. ............. 370/458 |
| 4,893,306 A | * | 1/1990 | Chao et al. ................. 370/458 |
| 5,072,449 A | * | 12/1991 | Enns et al. ................. 714/776 |
| 5,113,395 A | * | 5/1992 | Marakami et al. .......... 370/505 |
| 5,128,945 A | * | 7/1992 | Enns et al. ................. 714/776 |
| 5,159,595 A | | 10/1992 | Flanagan et al. |

(Continued)

FOREIGN PATENT DOCUMENTS

| | | |
|---|---|---|
| WO | PCT/US02/04451 | 2/2002 |
| WO | PCT/US02/04451 | 12/2003 |

OTHER PUBLICATIONS

PCT/US01/50087 Search Report mailed Jun. 4, 2002.
PCT/US02/05088 Search Report mailed Jun. 28, 2002.
PCT/US02/04451 Search Report mailed Jul. 18, 2002.
PCT/US02/04603 Search Report mailed Jul. 15, 2002.
Kusyk, R.G., "Analysis of Techniques for the Reduction of Jitter Caused by SONET Pointer Adjustments," IEEE Transactions on Communications, vol. 42, No. 2/3/4, pp. 2036–2050, Feb./Mar./Apr., 1994.
P.K. JHA, "Bandwidth Maximization for SONET/SDH and Direct Data over Optical Networks," http://www.isoc.org/inet2000/cdproceedings/lg/lg_3. htm, pp. 1–26, Nov. 16, 2000.

Primary Examiner—Steven Nguyen
Assistant Examiner—Roberta Stevens
(74) Attorney, Agent, or Firm—Blakely, Sokoloff, Taylor & Zafman LLP

(57) ABSTRACT

A method and apparatus for alignment of TDM-based signals for packet transmission using framed and unframed operations are described. In an embodiment, a line card in a network element includes a deframer unit that receives a Time Division Multiplexing (TDM) signal. The TDM signal includes a payload and overhead data. The deframer generates frame alignment data based on the overhead data. The line card also includes a packet engine unit coupled to the deframer unit. The packet engine unit receives the payload, the overhead data and the frame alignment data and generates a number of packet engine packets. The packet engine packets represent a frame within the TDM signal such that the packet engine packets include the payload, the overhead data and the frame alignment data. Additionally, the line card includes packet processor coupled to the deframer unit. The packet processor receives the packet engine packets and generates network packets based on the packet engine packets.

46 Claims, 7 Drawing Sheets

U.S. PATENT DOCUMENTS

| | | | |
|---|---|---|---|
| 5,187,711 A | * | 2/1993 | Hodohara .................... 714/4 |
| 5,268,936 A | | 12/1993 | Bernardy |
| 5,400,369 A | | 3/1995 | Ikemura |
| 5,511,077 A | | 4/1996 | Shimada |
| 5,519,700 A | * | 5/1996 | Punj ......................... 370/419 |
| 5,533,018 A | | 7/1996 | DeJager et al. |
| 5,550,820 A | | 8/1996 | Baran |
| 5,608,733 A | | 3/1997 | Vallee et al. |
| 5,621,773 A | | 4/1997 | Varma et al. |
| 5,825,770 A | | 10/1998 | Coady et al. |
| 5,963,564 A | | 10/1999 | Petersen et al. |
| 5,987,030 A | * | 11/1999 | Brockhage et al. ......... 370/394 |
| 6,038,226 A | * | 3/2000 | Ellersick et al. ............ 370/352 |
| 6,075,788 A | * | 6/2000 | Vogel ........................ 370/395 |
| 6,122,281 A | * | 9/2000 | Donovan et al. ........... 370/401 |
| 6,198,751 B1 | | 3/2001 | Dorsey et al. |
| 6,205,142 B1 | | 3/2001 | Vallee |
| 6,237,029 B1 | | 5/2001 | Master et al. |
| 6,272,144 B1 | * | 8/2001 | Berenbaum et al. ........ 370/419 |
| 6,359,887 B1 | * | 3/2002 | Brockhage et al. ......... 370/394 |
| 6,385,209 B1 | * | 5/2002 | Skirmont et al. ........... 370/419 |
| 6,466,591 B1 | * | 10/2002 | See et al. ................... 370/535 |
| 6,498,667 B1 | * | 12/2002 | Masucci et al. ............ 359/157 |
| 2001/0033580 A1 | | 10/2001 | Dorsey et al. |
| 2002/0018468 A1 | | 2/2002 | Nishihara |

* cited by examiner

ALIGNMENT OF TDM-BASED SIGNALS FOR PACKET TRANSMISSION USING FRAMED AND UNFRAMED OPERATIONS

This application claims the benefit of Provisional Application No. 60/280,661, filed Mar. 31, 2001.

FIELD OF THE INVENTION

The invention related to the field of telecommunications. More specifically the invention relates to alignment of Time Division Multiplexing (TDM) signals for packet transmission using frames and unframed operations.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been an increased need for various types of services that employ different protocols. For example, certain customers (e.g., companies providing voice services) of high-speed networks want to operate on a Time Division Multiplexing (TDM) Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP).

FIG. 1 illustrates a prior art traffic or line card within a network element for processing of packet-based data that is wrapped in different formats for transmission. In particular, FIG. 1 includes line card 100 that includes receiving unit 120 and transmitting unit 122. Receiving unit 120 includes deframer unit 102 that is coupled to packet engine unit 104, which in turn is coupled to packet processor 106. Transmitting unit 122 includes packet processor 108 that is coupled to packet engine unit 110, which in turn is coupled to framer unit 112. The packet-based data being received by and transmitted out from deframer unit 102 and framer unit 112, respectively, is encapsulated or wrapped into different formats or protocols. For example, one type of such format could include Synchronous Optical Network (SONET) and Synchronous Digital Hierarchy (SDH).

Within receiving unit 102, deframer unit 102 receives the encapsulated packet-based data and removes the payload of this encapsulated data, which is the packet-based data. Deframer unit 102 then forwards this payload to packet engine unit 104. Packet engine unit 104 locates the packet boundaries within the payload and forwards the packets to packet processor 106. Accordingly, packet processor 106 can perform various packet operations on such packets. For example, if the packets are Internet Protocol (IP) packets, packet processor 106 can include a forwarding table for forwarding these IP packets to other locations within the network that contains the network element that includes line card 100.

Within transmitting unit 122, packet processor 108 receives packets from other locations in the networks, such as IP routers for IP packets, and forwards such packets to packet engine unit 110. Packet engine unit 110 combines these packets into payloads of the protocol associated with the transmitting line coupled to framing unit 112. Packet engine unit 110 then forwards these payloads to framer unit 112. Framer unit 112 then encapsulates these payloads into the protocol for the transmitting line and forwards these encapsulated payloads thereon.

FIG. 2 illustrates a different prior art traffic or line card within a network element for processing of TDM traffic, including telephone calls, through a packet-based network. In particular, FIG. 2 includes line card 200 that allows for voice over IP and includes receiving unit 220 and transmitting unit 222. Receiving unit 220 includes deframer unit 202 that is coupled to interface unit 204 that is coupled to digital signal processor 206, which in turn is coupled to packet processor 208. Transmitting unit 222 includes packet processor 210 that is coupled to digital signal processor 212 that is coupled to interface unit 214, which in turn is coupled to framer unit 216.

The input into receiving unit 220 is TDM carrying telephone lines, such as Data Signal (DS)-3s and DS1s. In particular, 24 DS0 data streams, each associated with a given telephone call, are interleaved within a DS1. Moreover, under current transmission standards, 28 DS1 data streams can be interleaved into a single DS3. Deframer unit 202 receives the DS3s or DS1s and removes the DS0s contained therein. Moreover, the DS3 and DS1 data streams contain overhead bits that indicate the beginning of the DS3, DS1 and DS0 frames within such data streams. Accordingly, in addition to transmitting the DS0 data streams to interface unit 204, deframer unit 202 transmits signals indicating the beginning and ending points of these DS0 data streams (i.e., frame alignment data) based on the overhead bits contained in the DS3 and DS1 data streams. In other words, deframer unit 202 removes overhead bits, including framing bits, and transmits the payload (the DS0s data streams) along with frame alignment data indicating the beginning and ending points of the DS0 data streams to interface unit 204.

Interface unit 204 receives the interleaved DS0 data streams and formats such streams for processing by digital signal processor 206. Digital signal processor 206 receives the 24 interleaved DS0 data streams, which are effectively 24 separate telephone calls, and separates the DS0 data streams and creates 24 separate packet streams for subsequent packet processing and transmission. Moreover, digital signal processor 206 may compress some or all of 24 packet streams for subsequent transmission. Digital signal processor 206 then transmits these packet streams to packet processor 208. Packet processor 208 typically acts as a router using a forwarding table to router the packets through the network to the destined location.

Disadvantageously, line card 200 is typically located within a network element wherein the real estate for the racks holding the line cards of such network elements is considered to be expensive due to space limitations. In particular, such network elements are typically located a central office or on the premises of large customers. Accordingly, all of the hardware within line card 200, including interface unit 204 and digital signal processor 206, are considered very costly in terms of real estate. Moreover, digital signal processor 206 tends to consume a relatively large amount of power, which needs to be limited in this location. Moreover, digital signal processor 206 conventionally includes processing power that can handle more TDM signals than is provided at such locations.

FIG. 3 illustrates a prior art TDM switch for switching of DS0 data streams. This TDM switch, also termed a class 4 or class 5 switch, includes TDM bus 304, which is coupled to time-slot interchanger 302, (de)framer units 306–310 and DS0 interface 312. DS0 interface 312 is an interface that couples a number of DS0s from a number of different sources to TDM bus 304. For example, DS0 interface 312 could receive such DS0s from a Plain Old Telephone Service (POTS) line or to other sources that generate DS0s. (De)framer units 306–310 typically receive a number of DS3 and/or DS1 signals from external transmission lines and break such signals down into the DS0s contained therein. Additionally, a number of different DS0s are placed onto TDM bus 304 from (de)framer units 306–310 and DS0s 312. Such DS0s are then transmitted to time-slot interchanger 302 wherein the DS0s are re-ordered and routed back out from the TDM switch through (de)framer units 306–310 and DS0s 213.

For example, time-slot interchanger 302 could receive a first DS0 originating from a DS3 signal from (de)framer unit 306 and transmit this DS0 out (de)framer unit 310. Similarly, time-slot interchanger 302 could receive a second DS0 originating from a DS1 signal from (de)framer unit 308 and transmit this DS0 out (de)framer unit 310. Accordingly, (de)framer unit 310 could place these two DS0s along with 22 other DS0s into a DS1 signal and transmit this DS1 signal out from the TDM switch of FIG. 3. As illustrated, the TDM switch of FIG. 3 acts as a TDM cross-connect by allowing for the switching of TDM data at the DS0 level.

SUMMARY OF THE INVENTION

A method and apparatus for alignment of TDM-based signals for packet transmission using framed and unframed operations are described. In an embodiment, a line card in a network element includes a deframer unit that receives a Time Division Multiplexing (TDM) signal. The TDM signal includes a payload and overhead data. The deframer generates frame alignment data based on the overhead data. The line card also includes a packet engine unit coupled to the deframer unit. The packet engine unit receives the payload, the overhead data and the frame alignment data and generates a number of packet engine packets. The packet engine packets represents a frame within the TDM signal such that the packet engine packets include the payload, the overhead data and the frame alignment data. Additionally, the line card includes a packet processor coupled to the deframer unit. The packet processor receives the packet engine packets and generates network packets based on the packet engine packets.

In another embodiment, a method includes receiving a TDM signal that includes overhead data and payload data. Frame alignment data is generated based on locations of frame boundaries within the TDM signal. The method also includes placing the TDM signal into packet engine packets based on the frame boundaries within the TDM signal. The overhead data, the payload data and the frame alignment data are within packet engine packets. Each packet engine packet corresponds to a frame within the TDM signal. The method also includes a encapsulating the packet engine packets into network packets.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of Figure. For example, system 400 can be located in FIG. 4. However, element numbers are the same for those elements that are the same across different Figures. In the drawings.

DETAILED DESCRIPTION

A method and apparatus for alignment of TDM-based signals for packet transmission using framed and unframed operations are described. In the following description, for purposes of explanation, numerous specific details are set forth in order to provide a thorough understanding of the present invention. It will be evident, however, to one skilled in the art that the present invention may be practiced without these specific details.

SYSTEM DESCRIPTION

Figure 4:
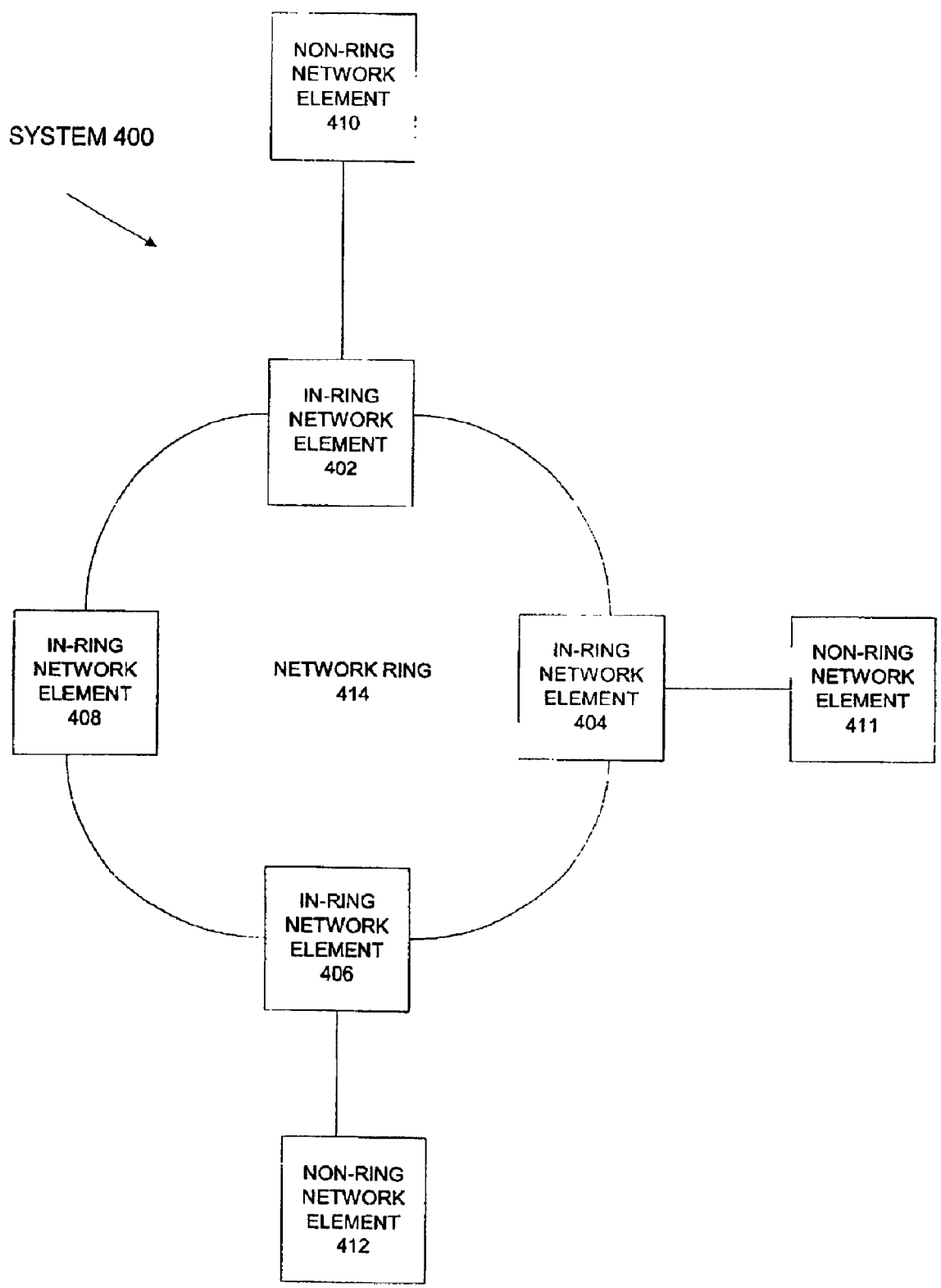
FIG. 4 is block diagram illustrating a system that incorporates embodiments of the present invention.

FIG. 4 is block diagram illustrating a system that incorporates embodiments of the present invention. In particular, FIG. 4 illustrates system 400 that includes network ring 414, which is comprised of in-ring network element 402, in-ring network element 404, in-ring network element 406 and in-ring network element 408. System 400 also include non-ring network element 410, non-ring element 411 and non-ring network element 412, which are coupled to network ring 414 through in-ring network element 402, in-ring network element 404 and in-ring network element 406, respectively. In an embodiment, non-ring elements 410–412 can be routers, switches, bridges or other types of network element that switch data across a network.

In one embodiment, the connection among in-ring network element 402, in-ring network element 404, in-ring network element 406 and in-ring network element 408 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 400 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, J1, E1, E3, Data Signal (DS) 3 and DS1 signals. In one embodiment, data traffic among in-ring network element 402, in-ring network element 404, in-ring network element 406 and in-ring network element 408 includes TDM traffic and packet traffic within a same Time Division Multiplexing (TDM) signal.

In this ring network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switches; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 400 and the network elements therein is described in more detail below.

The architecture and configuration of system 400 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 4. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also apply to Wave Division Multiplexing (WDM) networks.

NETWORK ELEMENT DESCRIPTION

Figure 5:
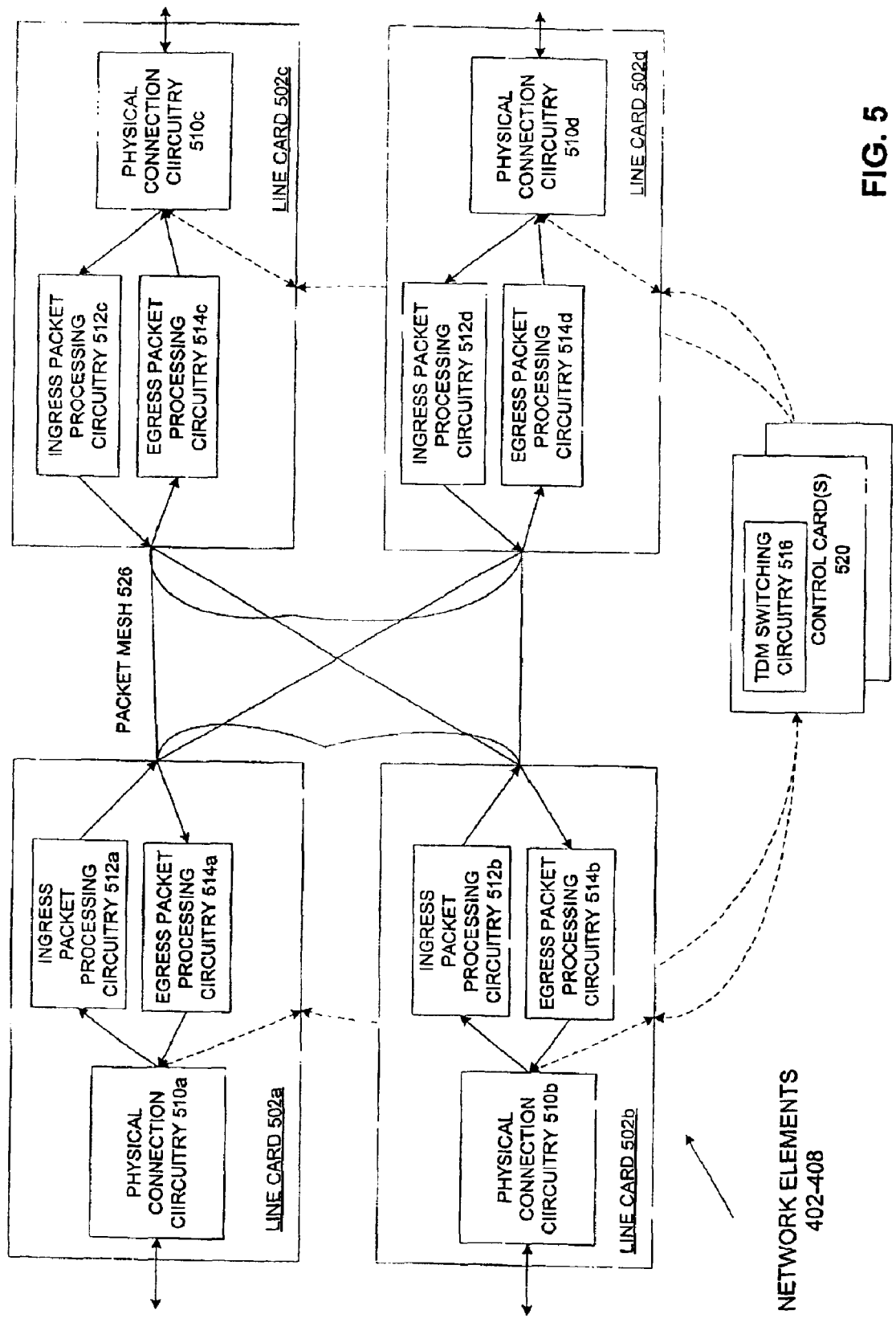
FIG. 5 illustrates portions of in-ring network elements 102–108, according to embodiments of the present invention.

FIG. 5 illustrates portions of in-ring network elements 402–408 (for purposes of FIG. 5, hereinafter "network element 402"), according to embodiments of the present invention. As shown, network element 402 includes line cards 502a–d and control card(s) 520, such that control card(s) 520 are coupled to each of line cards 502a–d. The number of line cards illustrated are for the sake of simplicity and not by way of limitation, as a lesser or greater number of lines cards can be included within network element 402. Additionally, network element 402 includes a first switch fabric, packet mesh 526, which includes a full mesh such that each of line cards 502a–d is coupled to one another. For example, line card 502a is coupled to line cards 502b–d through packet mesh 526. However, embodiments of the present invention are not limited to a full mesh for the transmission of packets among line cards 502a–d, as any type of switching method that switches based on the addressing scheme described herein can be incorporated into embodiments of the present invention. For example, in one embodiment, line cards 502a–d could be coupled together using a switch fabric, such that the line cards are coupled to a control card, which provides for the switching therein.

Line cards 502a–d include physical connection circuitry 510a–d, ingress packet processing circuitry 512a–d and egress packet processing 514a–d, respectively. Physical connection circuitry 510a–d can be coupled to lines external to network element 402, as shown, which can carry optical and/or electrical signals, which is described in more detail below in conjunction with FIG. 7. In one embodiment, line cards 502a–d of network element 402 may be connected to an optical line transmitting SONET OC-N signals. Moreover, in an embodiment, line cards 502a–d of network element 402 may be connected to an electrical line such as a T1, T3, J1, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 520 include TDM switching circuitry 516.

In an embodiment, each line card 502a–d can be coupled to four optical and/or electrical lines. In another embodiment, each line card 502a–d can be coupled to eight optical and/or electrical lines. In one embodiment, each line card 502a–d can be coupled to 12 electrical (T3) lines. However, embodiments of the present invention are not so limited, as a lesser or greater number of optical and/or electrical lines can be coupled to network element 402 through line cards 502a–d. Additionally, physical connection circuitry 510a–d are coupled to ingress packet processing circuitry 512a–d, respectively, such that packet data being received from the optical and/or electrical lines is passed from physical connection circuitry 510a–d to ingress packet processing circuitry 512a–d, respectively. In one embodiment, the packet data is extracted from a TDM signal, which is described in more detail below.

Ingress packet processing circuitry 512a–d is coupled to packet mesh 526. Accordingly, each ingress packet processing circuitry 512a–d is coupled to each egress packet processing circuitry 514a–d, respectively, on other line cards 502a–d through packet mesh 526. Moreover, egress packet processing circuitry 514a–d is respectively coupled to physical connection circuitry 510a–d, such that packet data traffic coming in from packet mesh 526 from ingress packet processing circuitry 512a–d is transmitted from egress packet processing circuitry 514a–d to physical connection circuitry 510a–d, respectively.

Line cards incorporated into embodiments of the present invention are not limited to those illustrated by line cards 502a–d. Moreover, the network elements can have different line card configurations from that shown by lines cards 502a–d. For example, a given in-ring network element could be limited to a single line card that can receive and transmit TDM traffic (which may include packet traffic) within network ring 414, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or sample in-ring network element. In one such embodiment, a third line card can be incorporated into this given in-ring network element to add, drop and transmit different types of traffic including different types of packet traffic, such as ATM, Frame Relay, IP, etc., received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of-ring network elements. To provide some examples with regard to a line card connected with an out-of-ring network element: 1) layer ⅓ traffic from out-of-ring network element can come in go through the packet mesh to a line card connected to an in-ring network element, and then out onto the ring being carried by a SONET frame; 2) layer ⅔ traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer ⅔ traffic can be processed by extract the layer ⅔ traffic, with the layer ⅔ traffic going through the packet mesh to a line card connected to an in-ring network element, and then out onto the ring carried by a SONET frame; layer ⅔ traffic coming form an out-of-ring network element can go through the packet mesh to an line card connected to an out-of-ring network element, and then go out of the ring being carried by the protocol of the interface of that egress line card; etc.

With regard to the TDM traffic, a second switch fabric (in addition to packet mesh 526) is formed among line cards 502a–d and TDM switching circuitry 516 of control cards 520, as illustrated by the dashed lines in FIG. 5. In particular, physical connection circuitry 510a–d is coupled to TDM switching circuitry 516 for the receiving and transmitting of TDM traffic into and out of network element 402. Accordingly, TDM switching circuitry 516 receive TDM traffic from physical connection circuitry 510a–d and switches this traffic to any of physical connection circuitry 510a–d, based on configuration data for the timeslots of the TDM traffic. For example, TDM switching circuitry 516 could be configured such that data within the first ten timeslots of a TDM signal, such as a SONET/SDH signal, received on a first interface of physical connection circuitry 510a are forwarded out the first five timeslots of a TDM signal being transmitted out from a first interface of physical connection circuitry 510d.

LINE CARD 502

Figure 6:
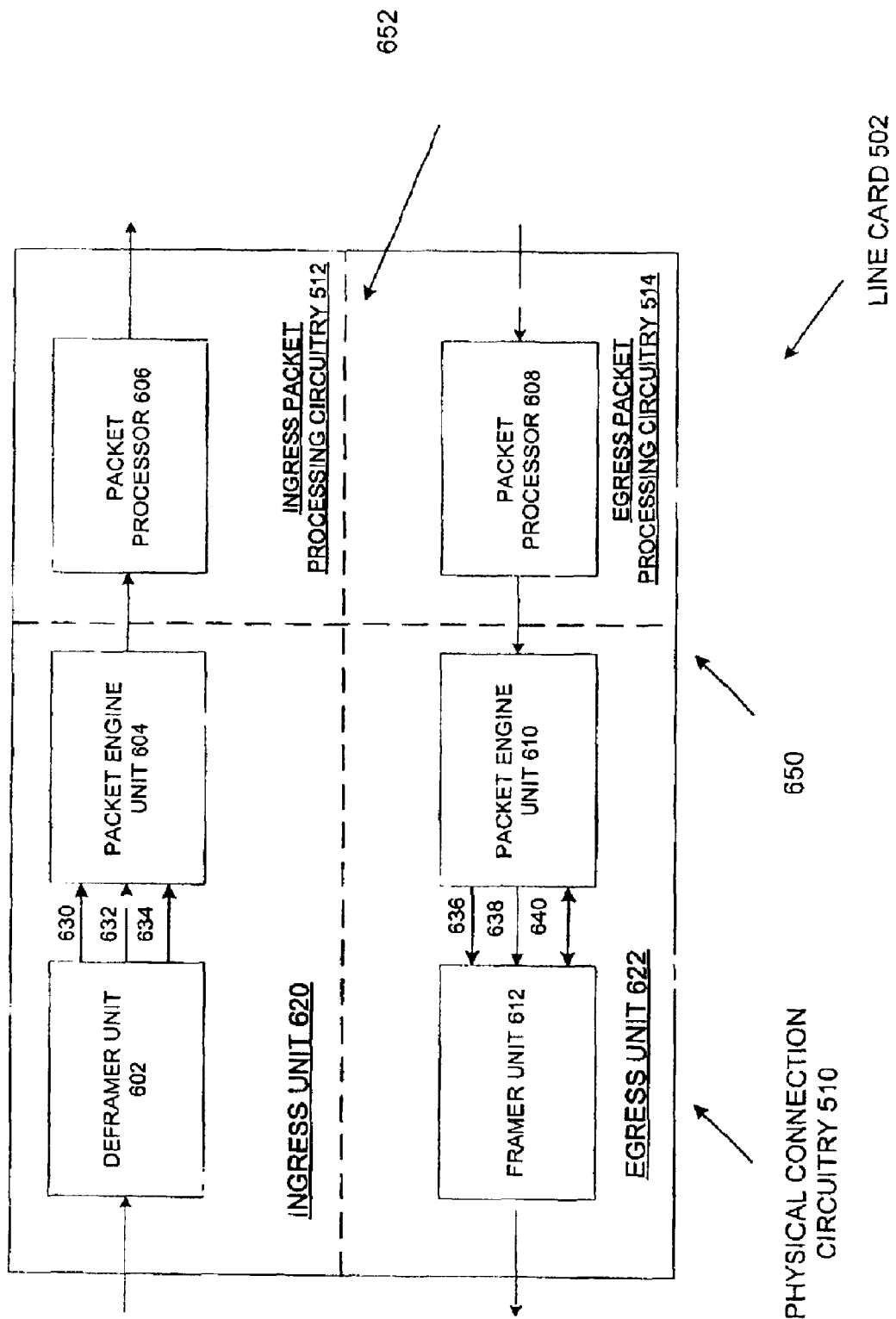
FIG. 6 illustrates portions of line card 502, according to embodiments of the present invention.

FIG. 6 illustrates portions of line card 502, according to embodiments of the present invention. In particular, FIG. 6 illustrates portions of physical connection circuitry 510, ingress packet processing circuitry 512 and egress packet processing circuitry 514. Physical connection circuitry 510 includes those blocks to the left of dashed line 650, while ingress packet processing circuitry 512 and egress packet processing circuitry 514 include those blocks to the ring of dashed line 650. Physical connection circuitry 510 includes deframer unit 602, packet engine 604, framer unit 612 and packet engine 610. Ingress packet processing circuitry 512 includes packet processor 606, while egress packet processing circuitry 514 includes packet processor 608.

Additionally, line card 502 of FIG. 6 is broken into ingress and egress units, as described above in conjunction with FIG. 5. Ingress unit 620 includes those blocks above dashed line 652, and egress unit 622 includes those blocks below dashed line 652. In particular, ingress unit 620 includes deframer unit 602, packet engine 604 and packet processor 606, while egress unit 622 includes framer unit 612, packet engine 610 and packet processor 608.

Ingress unit 602 receives a data signal, such as a number of DS3 signals, external to the network element, containing line card 502, through deframer unit 602. Deframer unit 602 is coupled to packet engine unit 604 through payload signal 630, frame alignment signal 632 and overhead data signal 634. The delineation of signals 630–634 is for the sake of clarity and not by way of limitation. For example, in one embodiment, there could be a single transmission line between deframer unit 602 and packet engine unit 604 for passing of the payload, frame alignment and overhead data signals. Packet engine unit 604 is coupled to packet processor 604, which is coupled to packet mesh 526 (shown in FIG. 5).

Egress unit 622 receives packets from packet mesh 526 (shown in FIG. 5) through packet processor 608. Packet processor 608 is coupled to packet engine unit 610. Moreover, packet engine unit 610 is coupled to framer unit 612 through payload signal 636, frame alignment signal 638 and overhead data signal 640. The delineation of signals 636–640 is for the sake of clarity and not by way of limitation. For example, in one embodiment, there could be a single transmission line between packet engine unit 610 and framer unit 612 for passing of the payload, frame alignment and overhead data signals. Framer unit 612 is coupled to an external data signal, such as a number of DS3 signals. The operation of the portions of line card 502 illustrated in FIG. 6 will now be described in terms of framed-based and unframed-based operations.

FRAMED-BASED OPERATIONS

The operation of the portions of line card 502 illustrated in FIG. 6 will now be described in terms of framed-based operations. In other words, in addition to other operations, line card 502 will locate the frame boundaries of the incoming TDM signals. Ingress unit 620 receives a data signal, such as a number of DS3 signals, external to the network element, containing line card 502, through deframer unit 602.

In one embodiment, with regard to ingress unit 620, deframer unit 602 receives a DS3 signal and extracts the 28 DS1 signals contained therein, as is known in the art. The subsequent operation of deframer unit 602, packet engine 604 and packet processor 606 will be described in terms of one of the 28 DS1 signals extracted from the incoming DS3 signal. The given DS1 signal used to illustrate the operation of line card 502 will be a DS1 superframe signal, as is known in the art. This is by way of example and not by way of limitation as signals employing other formats can be incorporated into embodiments of the present invention. For example, in another embodiment an extended superframe could be processed by line card 502. In an embodiment, other types of TDM-based signals, such as a DS3, E1 or J1 signal, could be used.

Figures 7, 8:
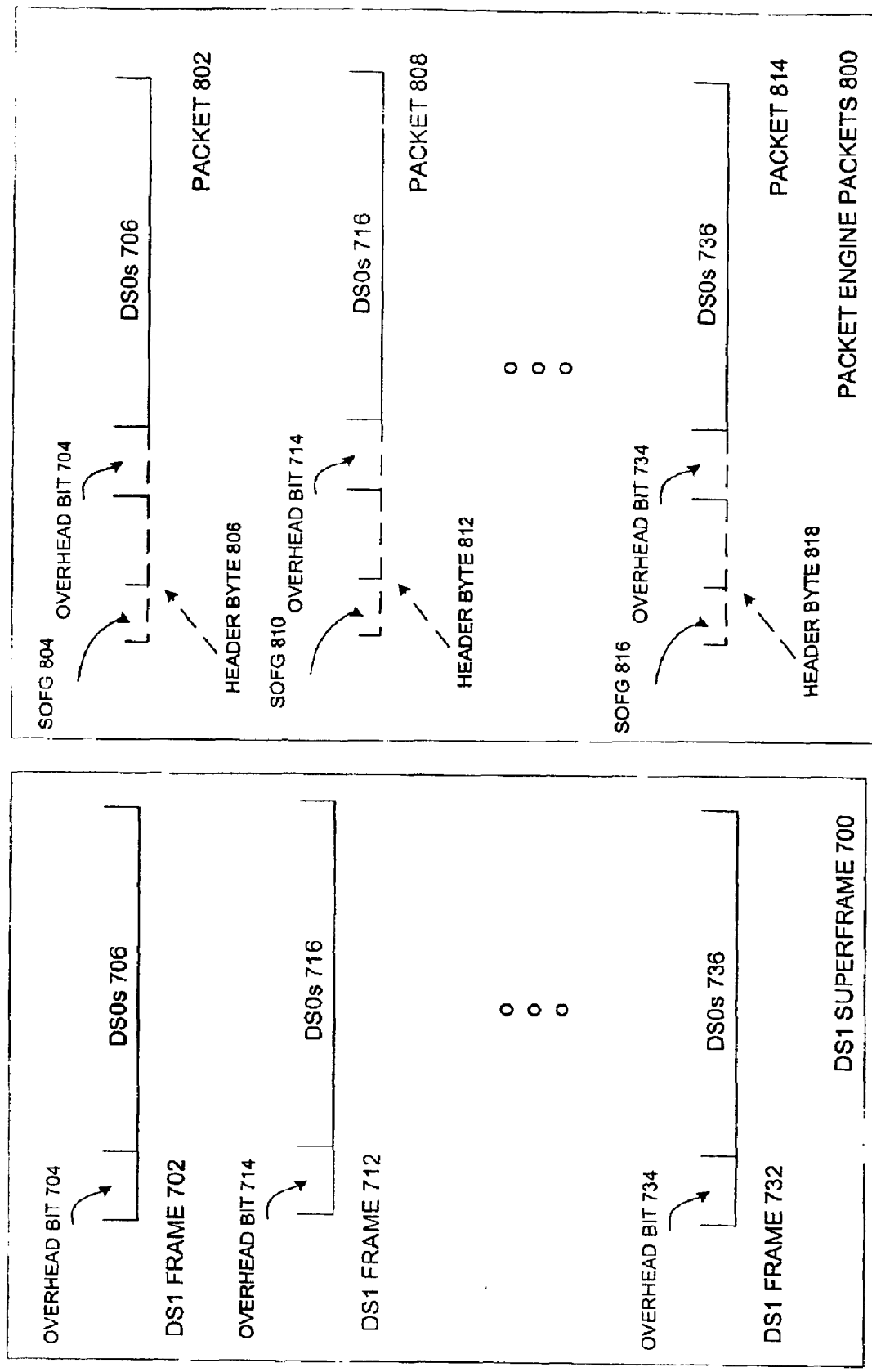
FIG. 7 illustrates a superframe DS1 signal and packet engine packets created there from, according to embodiments of the present invention.
FIG. 8 shows packet engine packets corresponding to DS1 frames within a DS1 superframe, according to embodiments of the present invention.

FIG. 7 illustrates a DS1 superframe according to embodiments of the present invention. In particular, FIG. 7 includes DS1 superframe 700. As is known in the art, a DS1 superframe includes 12 DS1 frames. However, for the sake of clarity DS1 superframe 700 includes the first two and the last DS1 frame within a DS1 superframe. In particular, DS1 superframe 700 includes DS1 frame 702, DS1 frame 721 and DS1 frame 732. Moreover, each of DS1 frames 702, 712 and 732 include overhead bits and a number of DS0s, as is known in the art. In one embodiment, a given DS1 frame includes 24 DS0s. Accordingly, DS1 frame 702 includes overhead bit 704 and DS0s 706, while DS1 frame 712 includes overhead bit 714 and DS0s 716. Additionally, DS1 frame 732 includes overhead bit 734 and DS0s 736.

In one embodiment, deframer unit 602 locates the beginning of DS1 superframe 700 as well as the locations of each DS1 frame contained therein. For example, deframer unit 602 identifies the beginning of DS1 702, 712 and 732. Moreover, in an embodiment, deframer unit 602 extracts overhead bits 704, 714 and 734 from DS1 702, 712 and 732, respectively. Accordingly, deframer unit 602 transmits DS0s, 706, 716 and 736 across payload signal 630 and overhead bits 704, 714 and 734 across overhead data signal 634. Moreover, deframer unit 602 transmits frame alignment data, including the beginning of DS1 superframe 700 as well as the beginning of each of DS1 702, 712 and 732, across frame alignment signal 632. As illustrated, deframer unit 602 transmits the payload (e.g., the DS0s), the overhead data (i.e., overhead bits) as well as frame alignment data (not just the payload of an incoming signal) to packet engine unit 604.

Packet engine unit 604 receives the DS0s, the overhead bits and the framing alignment data from deframer unit 602 and processes the data. In one embodiment, the processing of data by packet engine unit 604 includes the generation of packet engine packets such that each packet engine packet corresponds to a DS1 frame including the payload of DS0s and the overhead bits.

To help illustrate, FIG. 8 shows packet engine packets corresponding to DS1 frames within a DS1 superframe, according to embodiments of the present invention. Packet engine packets 800 include packets 802, 808 and 814 that correspond to DS1 frames 702, 712 and 732 of FIG. 7, respectively. As illustrated, a packet engine packet includes a header byte along with a payload. The payload of such packets includes the DS0s from the DS1 frames.

For example, packet engine packet 802 includes DS0s 706 of DS1 frame 702 along with header byte 806, which includes start of frame group (SOFG) 804 and overhead bit 704. SOFG 804 is part of the frame alignment data generated by deframer unit 602 and indicates whether the DS1 frame contained in the payload of the network engine packet is the first DS1 frame within the superframe. For example, for DS1 frame 702, which is the first DS1 frame in DS1 superframe 700, SOFG 804 will indicate that this is the first frame in DS1 superframe 700, while SOFG 810 and 816 of packets 808 and 814, respectively, would indicate that they are not the first frame within DS1 superframe 700.

However, embodiments of the present invention are not so limited, as this SOFG data could indicate other frame alignment data. For example, in another embodiment wherein the signal being transmitted to packet engine unit 604 is a DS3 signal, this SOFG data could indicate the first subframe within the DS3 signal. Overhead bit 704 is the overhead bit from DS1 frame 702.

Similarly, packet engine packet 808 includes DS0s 716 of DS1 frame 712 along with header byte 812, which includes start of frame group (SOFG) 810 and overhead bit 714. Packet engine packet 814 includes DS0s 736 of DS1 frame 732 along with header byte 818, which includes start of frame group (SOFG) 816 and overhead bit 734. As illustrated by FIG. 8, packet engine unit 604 generates packet engine packets based on DS1 frames such that the entire framing structure including the payload and overhead bits are included therein. Moreover, these packet engine packets also included the frame alignment data generated by deframer unit 602 within the header bytes of these packets.

Packet engine unit 604 transmits packet engine packets 800 to packet processor 606. Packet processor 606 generates a header for deployment as a network packet through packet mesh 526 (shown in FIG. 5) to egress unit 622 of another or same line card within a given network element. In one embodiment, the network packet generated is an IP packet. However, embodiments of the present invention are not so limited, as any other type of packet can be generated by packet processor 606.

Returning to FIG. 6, in one embodiment, with regard to egress unit 622, packet processor 608 receives a number of packets from packet mesh 526 (shown in FIG. 5) destined to be outputted from line card 502 on which packet processor 608 is residing. In one such embodiment, each packet being received is associated with a frame for a given TDM signal. For example, the packet could include a DS1 subframe within a DS3 signal. In another embodiment, the packet could include a frame within a DS1 superframe or extended superframe signal. The above examples of the types of frames that can be included within the packets being received by packet processor 608 are by way of example and not by way of limitation, as other types of frames within TDM signals can be included.

Packet processor 608 removes the packet header placed on the packet by packet processor 606 from which the packet originated, thereby leaving packet engine packets as illustrated by FIG. 8. Packet processor 608 forwards these packets to packet engine unit 610. In an embodiment, packet unit 610 forwards the payload of a packet engine packet across payload signal 636. Using the example used for ingress unit 620 of a DS1 superframe signal, the payload for the packet engine packets will include the DS0s for the DS1 frame included in the packet. Returning to FIG. 8 to help illustrate, for packet 802, DS0s, 706 will be transmitted across payload signal 636.

Additionally, packet engine unit 610 transmits the overhead bits for the DS1 frame to framer unit 612 across overhead data signal 638. For example, for packet 802, overhead bit 704 is transmitted across overhead data signal 638. In one embodiment, packet engine unit 610 also transmits frame alignment data for the DS1 frame to framer unit 612 across frame alignment signal 640. For example for packet 802, SOFG 804 is transmitted across frame alignment signal 640. Framer unit 612 receives the DS0s, the overhead data and the frame alignment data and aligns the DS1 signal using bit stuffing operations when necessary and transmitting the DS1 signal out from egress units 622, as is known in the art.

In an alternative embodiment, frame alignment data would be transmitted by framer unit 612 to packet engine unit 610 across frame alignment signal 640, thereby allowing packet engine unit 610 to locate the boundaries for the signal to be transmitted. In such an embodiment, packet engine unit 610 performs the necessary bit stuffing operations for alignment the signal. In one embodiment, framer unit 612 receives a timing reference and generates the frame structure of the signals by counting positions. In one such embodiment, the timing reference may include a synchronization pulse to mark the start of a frame. In an embodiment, the internal counter of framer unit 612 counts along independently at the rate provided by the timing reference. Accordingly, the associated deframer receiving the signal being framed by framer unit 612 synchronizes with framer unit 612. Packet engine unit 610 then forwards the signal to framer unit 612. Framer unit 612 transmits the signal out from line card 502.

In an embodiment, wherein the TDM signal being transmitted from deframer unit 602 and packet engine unit 604 includes a DS3 signal, deframer unit 602 does not extract the overhead bits from the DS3 signal. Rather, the payload being transmitted across payload signal 630 will include the DS3 subframe for the given DS3 signal along with the overhead bits from the DS3 signal. Accordingly, the overhead bits are not placed within the header bytes of the packet engine packets, but remain within the payload of such packets. Returning to FIGS. 7 and 8 to help illustrate, for packet 802 used to packetize a DS3 subframe, header byte 806 will still include SOFG 804. However, the overhead bits will not be extracted from the payload and inserted into header byte 806. In contrast, these overhead bits will be included in the payload of packet 802. However, embodiments of the present invention are not so limited. In another embodiment, for the processing of a DS3 signal, the overhead bits are extracted from the DS3 subframes and are inserted into the header bytes of the packet engine packets.

UNFRAMED-BASED OPERATIONS

The operation of the portions of line card 502 illustrated in FIG. 6 will now be described in terms of unframed-based operations. In other words, operation will be described within line card 502 such that the frame boundaries of the incoming TDM signals are not located and such that the outgoing TDM signals are not framed. Even though described in terms of not framing the incoming signals, embodiments of the present invention are not so limited. In one embodiment, line card 502 may still frame the incoming signal, but are not required for the subsequently described operations. For example, ingress unit 620 may still frame to ease the processing burden of another network element that receive this data and may require framing of such data.

The following description of the unframed-based operations will be described such that a DS3 signal is framed to locate its DS1 signals, wherein the DS1 signals are processed independent of any such framing. This is by way of example and not by way of limitation, as other types of TDM-based signals can be incorporated into embodiments of the present invention. For example, in an embodiment, the incoming TDM signal could be an E1 or E3 signal. With regard to ingress unit 620, deframer unit 602 receives the DS3 signal and forwards the signal to packet engine unit 604 through payload signal 603, frame alignment signal 632 and/or overhead data signal 634. In other words, in an embodiment, deframer unit 602 does not locate the frames within the incoming signal or generate framing information there from.

In one embodiment, packet engine unit 604 receives this incoming bit stream, including the payload and overhead data, and breaks this stream into a defined number of bits independent of framing boundaries and places these bits into the payload of packet engine packet. In one embodiment, the defined number of bits are such that the packet engine packets are 32 bytes in size. However, embodiments of the present invention are not so limited, as greater or lesser size packet engine packets can be incorporated into embodiments of the present invention.

For example, in one embodiment, the incoming signal into deframer unit 602 includes a DS3 signal. Deframer unit 602 separates this DS3 signal into its component DS1 signals. However, in one such embodiment, the individual DS1 signals are not framed. Instead, a given DS1 signal is arbitrarily broken into frame-sized pieces without regard to the actual frame boundaries within the DS1 signal. Moreover, in an embodiment, the bits of such frame-sized pieces are placed into packet engine packets 800 having the appropriate SOFG, overhead bit and payload format, as if the bits were overhead and payload bits of a given frame. However, the SOFG bit of the packet would not be set, as no framing is involved herein.

Returning to FIG. 8 to help illustrate, the defined number of bits are placed into the location designated for DS0s. For example, for packet 802, this defined number of bits from the incoming bit stream are placed into the location for DS0s, 706. Similar to the framed-based operations, header byte 806 is generated for packet 802. However, header byte 806 does not include SOGF 804 or overhead bit 704, as there is no framing involved in this embodiment. Overhead bit 704 is, however, included in the incoming bit stream.

Packet engine unit 604 transmits packet engine packets 800 to packet processor 606. Similar to the framed-based operations, packet processor 606 generates a header for deployment as a network packet through packet mesh 526 (shown in FIG. 5) to egress unit 622 of another or same line card. In one embodiment, the header includes the source and destination for the packet. The source is determined based on the line card and if multiple ports on the line card, which port the data within the packet is being received from. The destination is determined based on forwarding tables, which are known in the art, that packet processor 606 accesses from a memory location internal or external to packet processor 606 (not shown). In one embodiment, the network packet generated is an IP packet. However, embodiments of the present invention are not so limited, as any other type of packet can be generated by packet processor 606.

In another embodiment, packet engine unit 604 does not processes the incoming bits (i.e., the generation of a packet engine packet), including the division of the incoming bits and the placement of a header thereon to form these packets. Rather, packet engine unit 604 passes these incoming bits to packet processor 606. In such an embodiment, packet processor 606 delineates these incoming bits to place such bits into packets of a given size, which varies depending on the protocol or standard employed for transmission out from packet processor 606.

With regard to egress unit 622, packet processor 608 receives a number of packets from packet mesh 526 (shown in FIG. 5) destined to be outputted from line card 502 on which packet processor 608 is residing. Packet processor 608 removes the packet header placed on the packet by packet processor 606 from which the packet originated, thereby leading packet engine packets as illustrated by FIG. 8. Packet processor 608 forwards these packets to packet engine unit 610. Packet engine unit 610 removes the bits from the payload of packet engine packets 800 and forwards these bits to framer unit 612 through payload signal 636, frame alignment signal 638 and/or overhead data signal 640. Framer unit 612 passes these bits onto the outgoing line, independent of any framing. In other words, framer unit 612 dumps the bits onto the outgoing line without regard for framing of such bits.

SYSTEM APPLICATIONS

Figure 2:
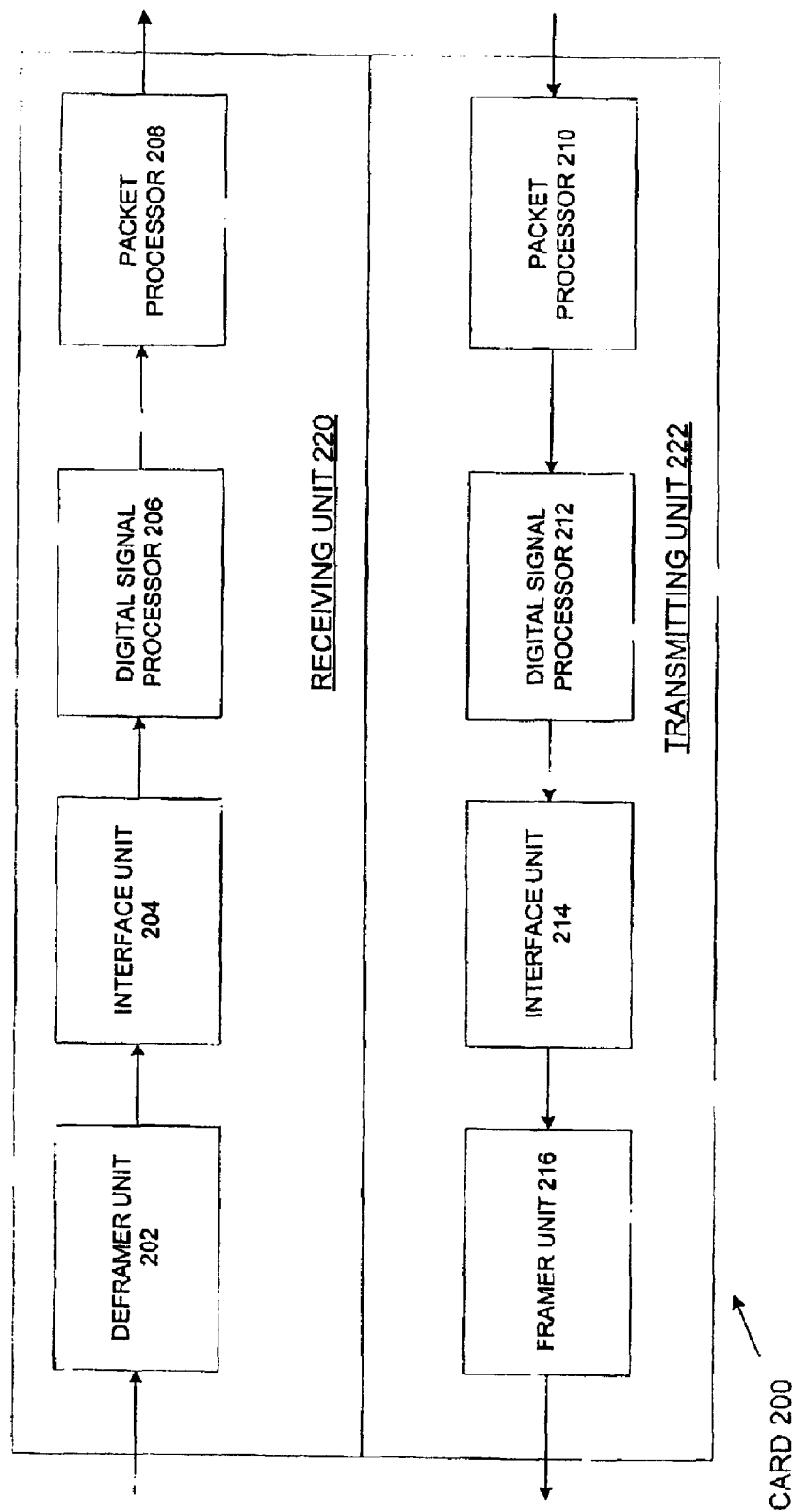
FIG. 2 illustrates a different prior art traffic or line card within a network element for processing of TDM traffic through a packet-based network.

System applications related to both framed-based and unframed-based operations will now be described. As illustrated, by FIGS. 7 and 8, for framed-based operations, embodiments of the present invention break down the incoming TDM signals into this constituent parts for transmission as network packets, while maintaining the framing structure of the original TDM signals, including the payload and the overhead bits contained therein, as well as frame alignment data related to the signal. Moreover, embodiments of the present invention can provide the functionality of the prior art illustrated in FIG. 2, independent of interface units 204 and 214 and digital signal processors 206 and 212, thereby reducing the real estate as well as the power consumption required there from.

In particular, upon receipt of packet engine packets 800 from packet engine unit 610, packet processor can break the DS0s within the payload into individual DS0s packet streams. Accordingly, in an embodiment, the individual DS0s are buffered and packetized independent of other DS0s within the DS1 frames. For example, the first DS0 of a first DS1 frame are buffered with the first DS0s of the subsequent DS1 frames and packetized based on the number of bits to be included in the payloads of the packets to be transmitted out from packet processor 606. Moreover, packet processor 606 can compress one to any number of the DS0s packet streams, as provided by digital signal processor 206, using standard compression techniques. In one embodiment, packet processor 606 can transmit one to any number of the DS0s packet streams to a remote location for compression of such streams. Accordingly, the compression can be performed by processors, such as a digital signal processor, located in remote locations (e.g., other network elements) without occupying expensive real estate on the line cards of this network element.

In an embodiment, packet processor 606 encapsulates these packets with headers that include the source and destination, as described above with other packets being processed by packet processor 606. Packet processor 606 forwards these DS0 packet streams to egress units 622 of this or other line cards of the given network element for external transmission. Moreover, in an embodiment, the overhead bits and frame alignment data are transmitted to the receiving egress unit 622 through the packet stream. Packet processor 608 of the receiving egress unit 622 receives the DS0 packets and interleaves the DS0s into DS1 frames. Additionally, packet processor 608 generates packet engine packets 800 using the interleaved DS0s as payload along with overhead bits and frame alignment data with the headers, as illustrated by FIG. 8. Packet engine unit 610 and framer unit 612 generate the outgoing TDM signals, as described above.

Figure 3:
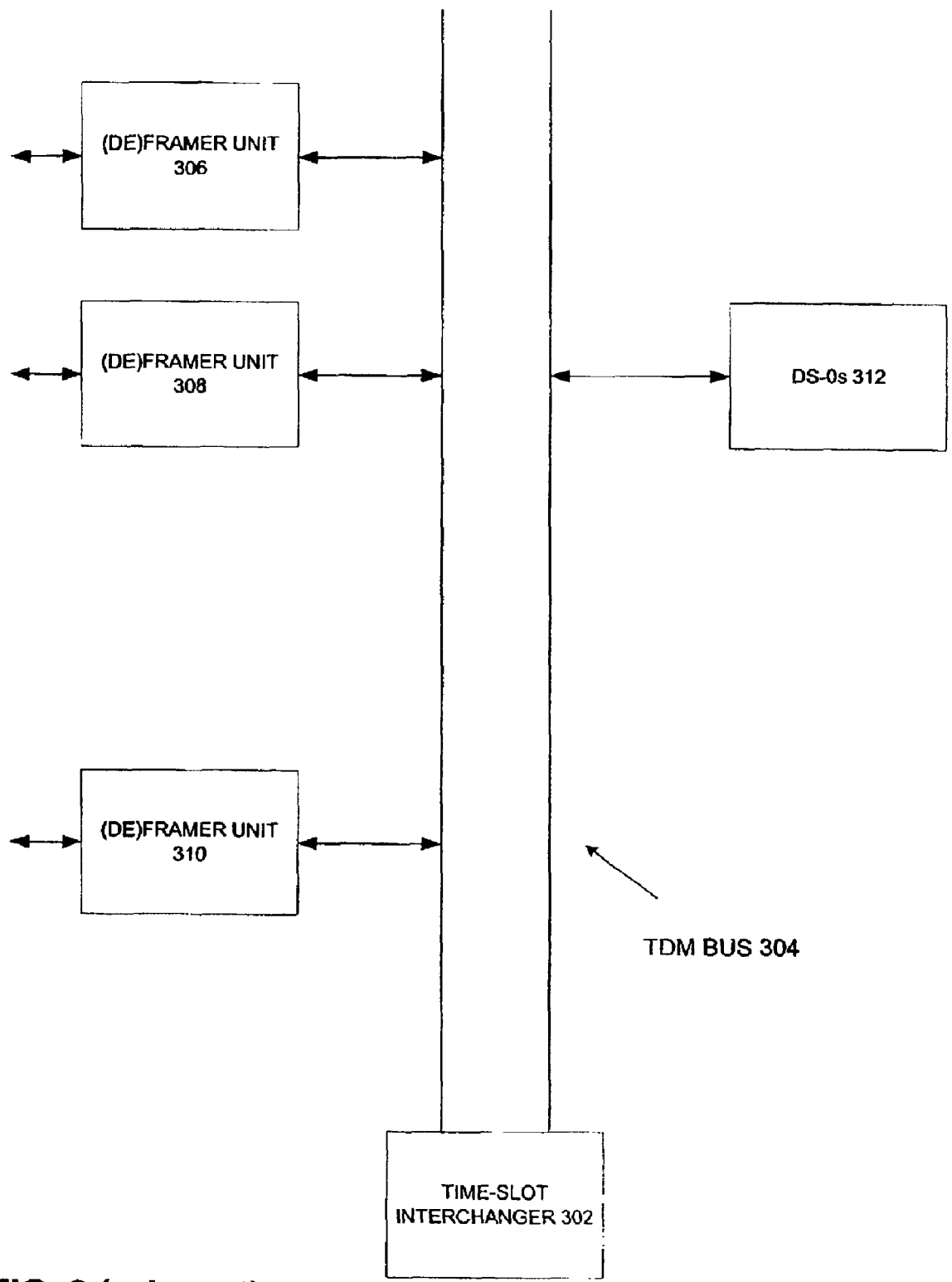
FIG. 3 illustrates a prior art TDM switch for switching of DS0 data streams.

Another system application for the frame-based operations could include the functionality provided by the prior art illustrated in FIG. 3 to allow for switching at the DS0 level. In particular, as set forth above in the other-described system application for frame-based operations, packet processor 606 can separate the individual DS0s within the payloads of packet engine packets 800 and generate individual DS0 packet streams across a number of DS1 frames. Accordingly, in one embodiment of the frame-based operations, packet mesh 526 (shown in FIG. 5) of network elements 402–408 can act as a full DS0-level cross connect.

As described above, these DS0s can be mapped into packet size data that can be processed by packet processor 606 and packet processor 608 as well as being switched through packet mesh 526. Returning to FIG. 5 to help illustrate, 24 DS0s could be generated by packet processor 606 of line card 502a. Additionally, an additional 24 DS0s could be generated by packet processor 606 of line card 502b. Based on configuration of network element 402, the first 14 DS0s signals from line card 502a are to be combined with the last 10 DS0s from line card 502b and are to be transmitted out as a DS1 signal through an interface on line card 502d. Moreover, based on configuration of network element 402, the last 10 DS0s from line card 502a are to be combined with the first 14 DS0s from line card 502b and are to be transmitted out as a DS1 signal through an interface on line card 502c. The above-described switching and combining of DS0s is by way of example and not by way of limitation, as DS0s from any number of locations can be combined and switched based on forwarding tables and/or databases that packet processors 606 and 608 can access. As shown, DS0s can be switched through packet mesh 526 and interleaved within DS1s in different combinations such that a given outgoing TDM signal can include one to a number of DS0s from different incoming TDM signals.

System applications for unframed-based operations will now be described. In one embodiment of the unframed-based operations. Packet mesh 526 (shown in FIG. 5) of network elements 402–408 can act as a full DS1 or DS3 level cross connect. In particular, as described above, these TDM signals can be mapped into packet size data that can be processed by packet processor 606 and packet processor 608 as well as being switched through packet mesh 526, independent of locating framing boundaries within such signals.

Returning to FIG. 5 to help illustrate, 28 DS1 signals could be received by line card 502a. Additionally, an additional 28 DS1 signals could be received by line card 502b. Based on configuration of network element 402, the first 14 DS1 signals coming into line card 502a are to be combined with the last 14 DS1 signals coming into line card 502b and are to be transmitted out as a single DS3 signal through an interface on line card 502d. Moreover, based on configuration of network element 402, the last 14 DS1 signals coming into line card 502a are to be combined with the first 14 DS1 signals coming into line card 502b and are to be transmitted out as a single DS3 signal through an interface on line card 502c. These operations can be performed employing packet processors 606–608 and packet mesh 526.

In particular, each of the 28 DS1 signals being received by line card 502a and each of the 28 DS1 signals being received by line card 502b are mapped into packet size data and processed as packets through packet processor 606 and packets mesh 526, independent of the frames within such signals. These packets are received by packet processor 608 of the given line cards for which the DS1 signals are destined and reassembled into their original DS1 signals by the associated packet engine unit 610 and framer unit 612. For example, the packets making up the first 14 DS1 signals being received by line card 502a and the first 14 DS1 signals being received by line card 502b are received by packet processor 608 of line card 502d and are reassembled into their original DS1 signals by packet engine unit 610 and framer unit 612 of line card 502d. Moreover, framer unit 612 interleaves these 28 DS1 signals into a DS3 signal and transmits this DS3 signal out from line card 502.

Embodiments of the present invention are not such that the framed or unframed-based operations on the ingress side dictate the framed or unframed-based operations on the egress side. In one embodiment, ingress unit 620 frames the incoming signal based on the frame and/or frame group boundaries, as described above, while the receiving egress unit 622 performs the framing operations related to both the frame and frame group (e.g., DS1 superframe) boundaries for the outgoing signal from framer unit 612. In other words, using the SOFG, framer unit 612 replaces the overhead bits and aligns the payload with the frame and/or frame group boundaries. Accordingly, robbed-bit signaling and substrate formats that require alignment to frame group boundaries are passed intact. In such an embodiment, the input and output data links are treated as separate links for the purposes of line maintenance signaling.

In another embodiment, ingress unit 620 frames the incoming signal based on the frame and/or frame group boundaries, as described above, while the receiving egress unit 622 performs the framing operations related to only to the frame boundaries and not the frame group (e.g., DS1 superframe) boundaries for the outgoing signal from framer unit 612. In such an embodiment, the receiving egress unit 622 ignores the SOFG such that the frame group boundary is not aligned but the individual frames therein are. Accordingly, in the event of frame slippage due to clock differences, the slips occur in units of one frame. Such an embodiment can be used for long distance voice traffic. In such an embodiment, the input and output data links are treated as separate links for the purposes of line maintenance signaling.

In an embodiment, ingress unit 620 frames the incoming signal based on the frame and/or frame group boundaries, as described above, while the receiving egress unit 622 does not perform framing operations of the received signal. Therefore, the payload along with the overhead data is passed, thereby allowing the monitoring of the overhead information. In such an embodiment, the input and output data links are treated as parts of a single link for the purposes of line maintenance signaling.

In one embodiment, ingress unit 620 does not frame the incoming signal, while the receiving egress unit 622 also does not perform framing operations on this signal. The payload of this signal is forwarded with all of the overhead data still within the signal. In one such embodiment, the overhead data on this signal cannot be monitored. In such an embodiment, the input and output data links are treated as parts of a single link for the purposes of line maintenance signaling. Moreover, slippage within the signal is within framed-sized units.

In another embodiment, ingress unit 620 and the receiving egress unit 622 processes the signal in a transparent mode. The data is sent across packet mesh 526 as certain-sized packets without placing such data into the format of packet engine packets 800, illustrated in FIG. 8. In one such embodiment, slippage within the signal is within packet-sized units.

Moreover, will regard to timing between a given deframer at the line card where a TDM signal is to be packetized and the corresponding framer where the packetized signal is reconstructed, a number of mechanisms may be employed. In an embodiment, the framer on the line card where the TDM signal is packetized and the framer on the line card where the signal is reconstructed from packetized data are timed from a common network clock, while the far end network element sending the TDM signal to be packetized is loop timed (i.e., its framer is timed according to the signal received by its deframer). In one embodiment, the framer where the TDM signal is reconstructed and the framer at the far end network element where the signal originated are both timed from a common network clock that is distributed by some other transmission path.

In an embodiment, the framer where the TDM signal is reconstructed and the framer where such signal originates are not constrained to have common timing, thereby allowing frame-slips to occur. In one embodiment, the timing of the framer where the signal is reconstructed is adjusted according to timing information inferred from the arrival time of the packets and/or the length of the queue of packetized TDM data to be sent. In an embodiment, the timing of the TDM signal to be packetized is compared against the network clock. Accordingly, a measure of the deviation is placed in the packets of the TDM data and transmitted to where the TDM signal is reconstructed and used to adjust the timing of the framer therein. However, embodiments of the present invention are not so limited. For example, in another embodiment, the deviation from the network clock can be communicated to the reconstructing line card by other means or transmission paths. The above-described embodiments of the techniques to provide timing between a given deframer and framer are by way of example and not by way of limitation, as other techniques to allowing for such timing can be incorporated into embodiments of the present invention.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for alignment of TDM-based signals for packet transmission using framed and unframed operations have been described. Although the present invention has been described with reference to specific exemplary embodiments, it will be evident that various modifications and changes may be made to these embodiments without departing from the broader spirit and scope of the invention.

For example, embodiments of the present invention illustrated with FIGS. 7 and 8 were described with regard to a DS1 superframe. However, embodiments of the present invention are not so limited, as other transmission standards can be employed. For example, the E1 standard could be used. Therefore, the overhead bits illustrated in FIGS. 7 and 8 would become overhead bytes. In one such embodiment, the overhead bytes would be included within the payload of the signal.

Figure 1:
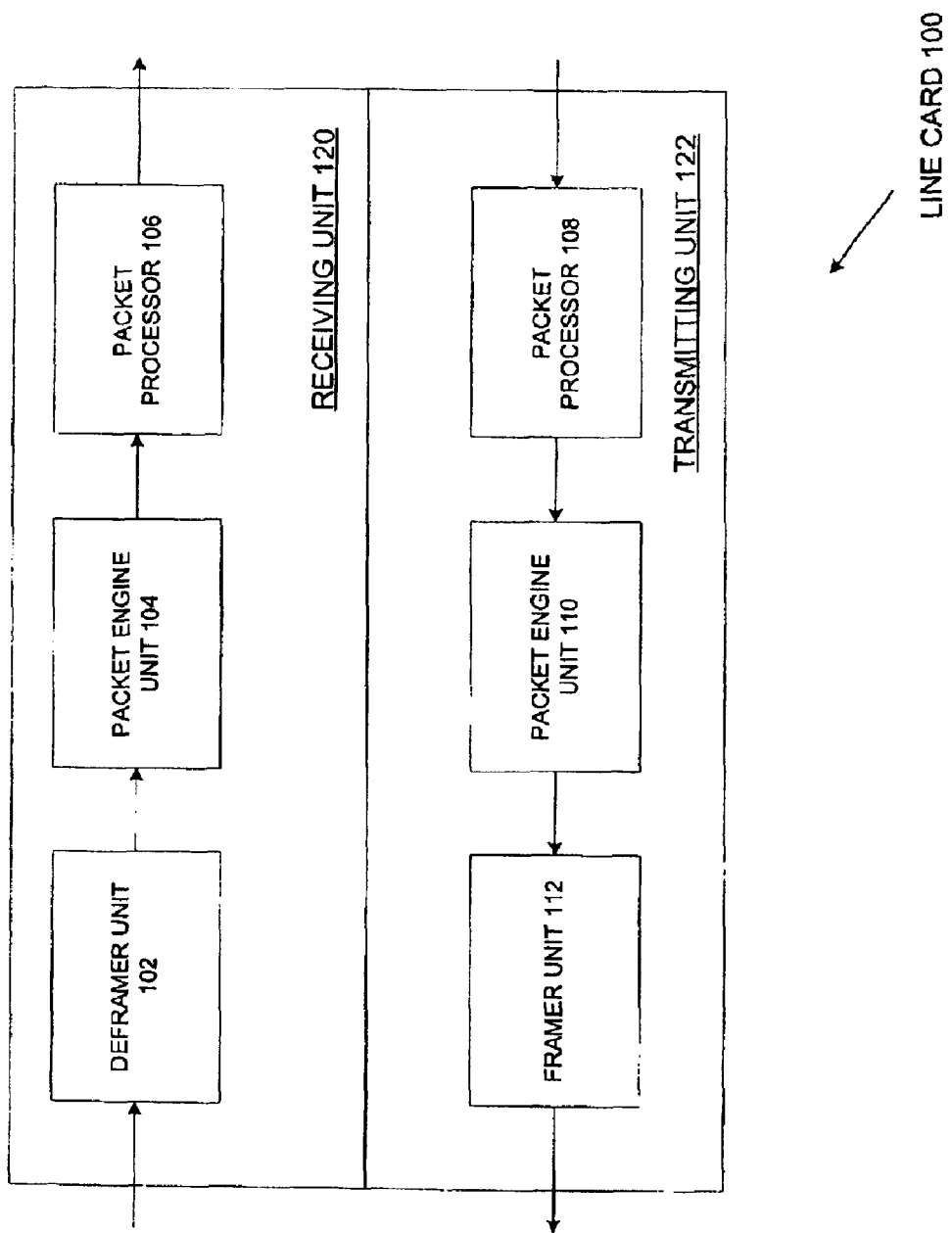
FIG. 1 illustrates a prior art traffic or line card within a network element for processing of packet-based data that is wrapped in different formats for transmission.

Moreover, embodiments of the present invention are described within a line card in an in-ring network element (illustrated in FIG. 1). However, embodiments of the present invention are not so limited. For example, embodiments of the present invention can be incorporated into other network elements, such as non-ring network elements.

Additionally, the processing was described across line cards and control cards. However, embodiments of the present invention are not so limited. For example, a single line card could incorporated the processing described across multiple line cards and/or control cards in the network elements. Moreover, the functionally described in card could be moved to a different card. For example, the functionality described in a line card could be incorporated into the control card. Accordingly, the specification and drawings are to be regarded in an illustrative rather than a restrictive sense.

What is claimed is:

1. A line card in a network element comprising:
   a deframer unit to receive a Time Division Multiplexing (TDM) signal, the TDM signal including a payload and overhead data, the deframer to generate frame alignment data based on the overhead data;

a packet engine unit coupled to the deframer unit, the packet engine unit to receive the payload, the overhead data and the frame alignment data and to generate a number of packet engine packets, wherein a payload of a packet engine packet stores one frame within the TDM signal such that the packet engine packets include the payload and the frame alignment data; and a packet processor coupled to the packet engine unit, the packet processor to receive the packet engine packets and to generate network packets based on the packet engine packets.

2. The line card of claim 1, wherein the packet engine packets include the payload, the overhead data and the frame alignment data.

3. The line card of claim 1, wherein the TDM signal includes a Digital Signal (DS)-1 signal.

4. The line card of claim 1, wherein the TDM signal includes a Digital Signal (DS)-3 signal.

5. The line card of claim 1, wherein the TDM signal includes an E1 signal.

6. The line card of claim 5, wherein the packet processor compresses the DS0 signals.

7. The line card of claim 1, wherein the packet processor separates Digital Signal (DS)-0 signals from within the TDM signal.

8. A network element comprising:
a number of line cards, each of the number of line cards including:
a deframer unit to receive a Time Division Multiplexing (TDM) signal, the TDM signal including a payload and overhead data, the deframer to generate frame alignment data based on the overhead data;
a packet engine unit coupled to the deframer unit, the packet engine unit to receive the payload, the overhead data and the frame alignment data and to generate a number of packet engine packets, wherein a payload of a packet engine packet stores one frame within the TDM signal such that the packet engine packets include the payload and the frame alignment data; and
a packet processor coupled to the packet engine unit, the packet processor to receive the packet engine packets and to generate network packets based on the packet engine packets; and
at least one control card coupled to a number of line cards.

9. The network element of claim 8, wherein the TDM signal includes a Digital Signal (DS)-1 signal.

10. The network element of claim 8, wherein the TDM signal includes a Digital Signal (DS)-3 signal.

11. The network element of claim 8, wherein the TDM signal includes a J1 signal.

12. The network element of claim 8, wherein the packet processor separates a number of Digital Signal (DS)-0 signals from within the TDM signal.

13. The network element of claim 12, wherein the packet processor for each of the line cards forwards the number of DS0 signals out to any of the number of line cards based on forwarding tables, wherein any of the number of DS0 signals from any of the number of line cards can be combined to form a DS1 signal.

14. The network element of claim 13, wherein the DS1 signal is transmitted out from the line cards.

15. The network element of claim 12, wherein the packet processor compresses the DS0 signals.

16. A method comprising:
receiving a TDM signal that includes overhead data and payload data;

generating frame alignment data based on locations of frame boundaries within the TDM signal;
placing the TDM signal into packet engine packets based on the frame boundaries within the TDM signal, wherein the overhead data, the payload data and the frame alignment data are within packet engine packets, such that each packet engine packet corresponds to a frame within the TDM signal; and
encapsulating the packet engine packets into network packets.

17. The method of claim 16, wherein the TDM signal includes a Digital Signal (DS)-1 superframe signal, such that each packet engine packet includes a DS1 frame of the DS1 superframe signal.

18. The method of claim 16, wherein the TDM signal includes a Digital Signal (DS)-1 extended superframe signal, such that each packet engine packet includes a DS1 frame of the DS1 extended superframe signal.

19. The method of claim 16, wherein the TDM signal includes a Digital Signal (DS)-3 signal, such that each packet engine packet includes a subframe of the DS3 signal.

20. The method of claim 16, wherein the network packets include Internet Protocol packets.

21. A method comprising:
receiving a first Time Division Multiplexing (TDM) signal that includes overhead data and payload data;
determining frame boundaries within the first TDM signal, and generating frame alignment data for the first TDM signal;
placing the first TDM signal into first packet engine packets based on the frame boundaries within the first TDM signal, wherein a payload of a packet engine packet stores one frame within the TDM signal;
receiving a second TDM signal;
placing the second TDM signal into second packet engine packets, independent of frame boundaries within the second TDM signal; and
generating network packets from the first and second packet engine packets using a same packet processor.

22. The method of claim 21, wherein placing the first TDM signal into first packet engine packets includes placing the overhead data, the frame alignment data and the payload data into the first packet engine packets.

23. The method of claim 21, wherein the first and second TDM signals include a Digital Signal (DS)-3 signal.

24. The method of claim 21, wherein the first and second TDM signals includes a Digital Signal (DS)-1 signal.

25. The method of claim 21, wherein the TDM signal includes a E3 signal.

26. A machine-readable medium that provides instructions, which when executed by a machine, caused said machine to perform operations comprising:
receiving a TDM signal that includes overhead data and payload data;
generating frame alignment data based on locations of frame boundaries within the TDM signal;
placing the TDM signal into packet engine packets based on the frame boundaries within the TDM signal, wherein the overhead data, the payload data and the frame alignment data are within packet engine packets, such the packet engine packet corresponds to a frame within the TDM signal; and
encapsulating the packet engine packets into network packets.

27. The machine-readable medium of claim 26, wherein the TDM signal includes a Digital Signal (DS)-1 superframe signal, such that each packet engine packet includes a DS1 frame of the DS1 superframe signal.

28. The machine-readable medium of claim 26, wherein the TDM signal includes a Digital Signal (DS)-1 extended superframe signal, such that each packet engine packet includes a DS1 frame of the DS1 extended superframe signal.

29. The machine-readable medium of claim 26, wherein the TDM signal includes a Digital Signal (DS)-3 signal, such that each packet engine packet includes a subframe of the DS3 signal.

30. The machine-readable medium of claim 26, wherein the TDM signal includes an E1 signal.

31. The machine-readable medium of claim 26, wherein the network packets include Internet Protocol packets.

32. A machine-readable medium that provides instructions, which when executed by a machine, cause said machine to perform operations comprising:
   receiving a first Time Division Multiplexing (TDM) signal that includes overhead data and payload data;
   determining frame boundaries within the first TDM signal, and generating frame alignment data for the first TDM signal;
   placing the first TDM signal into first packet engine packets based on the frame boundaries within the first TDM signal, wherein a payload of packet engine packet stores one frame within the TDM signal;
   receiving a second TDM signal;
   placing the second TDM signal into second packet engine packets, independent of frame boundaries within the second TDM signal; and
   generating network packets from the first and second packet engines packets using a same packet processor.

33. The machine-readable medium of claim 32, wherein placing the first TDM signal into first packet engine packets includes placing the overhead data, the frame alignment data and the payload data into the first packet engine packets.

34. The machine-readable medium of claim 32, wherein the first and second TDM signals include a Digital Signal (DS)-3 signal.

35. The machine-readable medium of claim 32, wherein the first and second TDM signals include a Digital Signal (DS)-1 signal.

36. The machine-readable medium of claim 32, wherein the TDM signal includes a J1 signal.

37. The network element of claim 8, wherein the frame alignment data includes a boundary of a superframe, the superframe to include a number of frames within the TDM signal.

38. An apparatus comprising:
   a packet processor to receive network packets, wherein payloads of the network packets are to include portions of a number of packet engine packets, the packet processor to extract the payloads of the network packets;
   a packet engine unit coupled to the packet processor, the packet engine unit to receive the payloads of the network packets, the packet engine unit to reconstruct the number of packet engine packets, wherein a packet engine packet corresponds to a frame of a TDM signal and includes frame alignment data for the TDM signal, the frame alignment data to include a boundary of a superframe, wherein the superframe is to include a number of frames within the TDM signal; and
   a framer unit coupled to the packet engine unit, the framer unit to receive the frames of the TDM signal and the frame alignment data, wherein the framer unit is to reconstruct the superframes within the TDM signal.

39. The apparatus of claim 38, wherein the TDM signal includes a Digital Signal (DS)-1 signal.

40. The apparatus of claim 38, wherein the TDM signal includes a Digital Signal (DS)-3 signal.

41. The apparatus of claim 38, wherein the TDM signal includes an E1 signal.

42. The apparatus of claim 38, wherein the packet processor comprises the DS0 signals.

43. The apparatus of claim 38, wherein the packet processor separates Digital Signal (DS)-0 signals from within the TDM signal.

44. An apparatus comprising:
   a line card, to be used in a network element, including,
      a deframer unit to deframe a frame that includes overhead data and a payload that is either TDM data or packet based data, the deframer to generate frame alignment data based on said overhead data when said payload is TDM data,
      a packet engine unit, coupled to the deframer unit, to generate a packet engine packet that includes the payload, the frame alignment data, and the overhead data from said frame when said payload of said frame is TDM data, and to locate packet boundaries within the payload of said frame when said payload of said frame is packet based data, and
      a packet processor coupled to the packet engine unit, to deframe the TDM data into lower layer frames and add a header to each to generate network packets when said payload of said frame is TDM data, and to generate network packets based on the payload and the located packet boundaries when said payload of said frame is packet-based data.

45. The apparatus of claim 44, wherein the packet processor also to compress one or more of said lower layer frames.

46. The apparatus of claim 44, wherein the packet processor to cause one or more of said lower layer frames to compressed at a remote location before generation of said network packets.

* * * * *